Patented Oct. 31, 1944

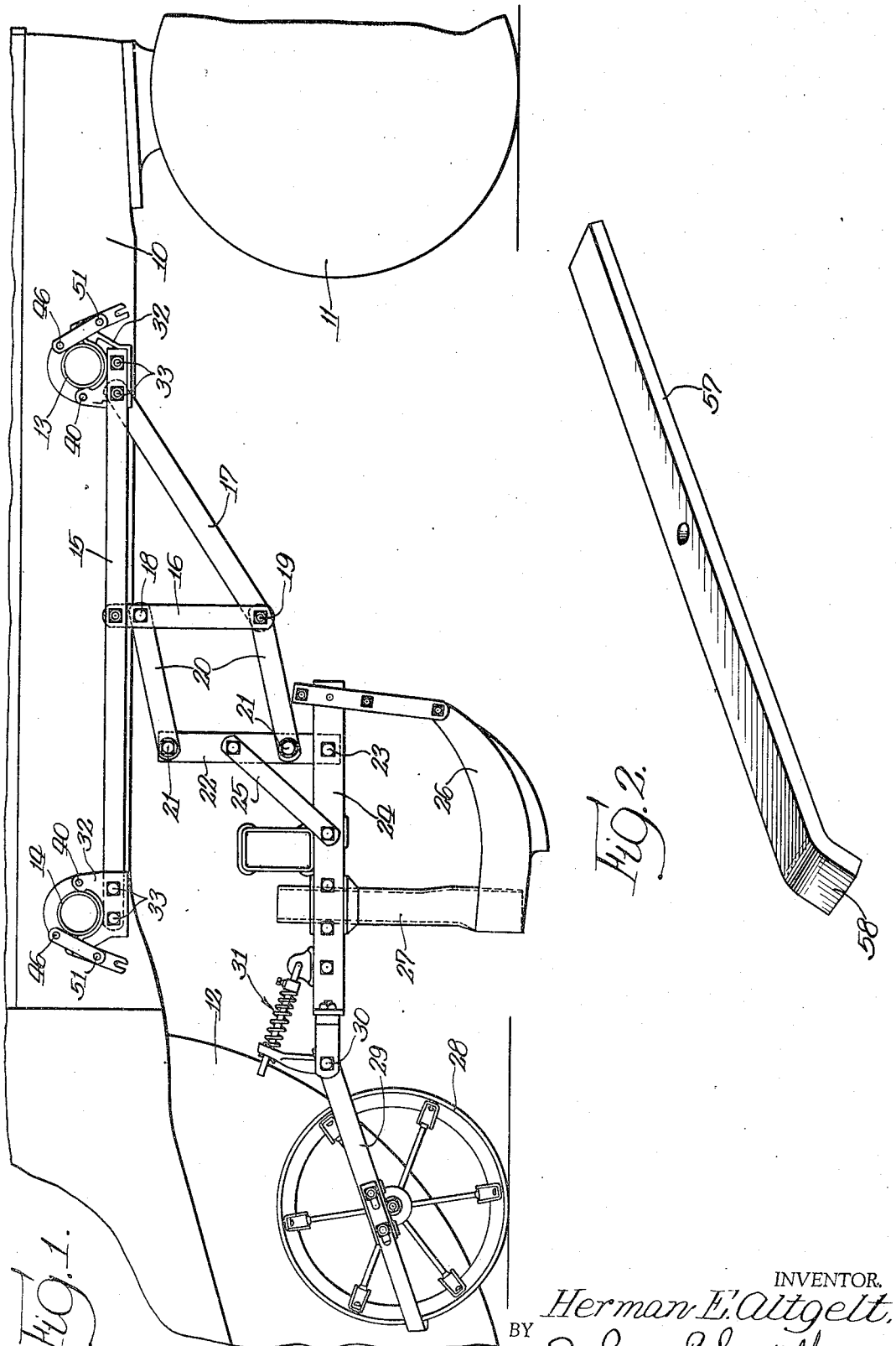

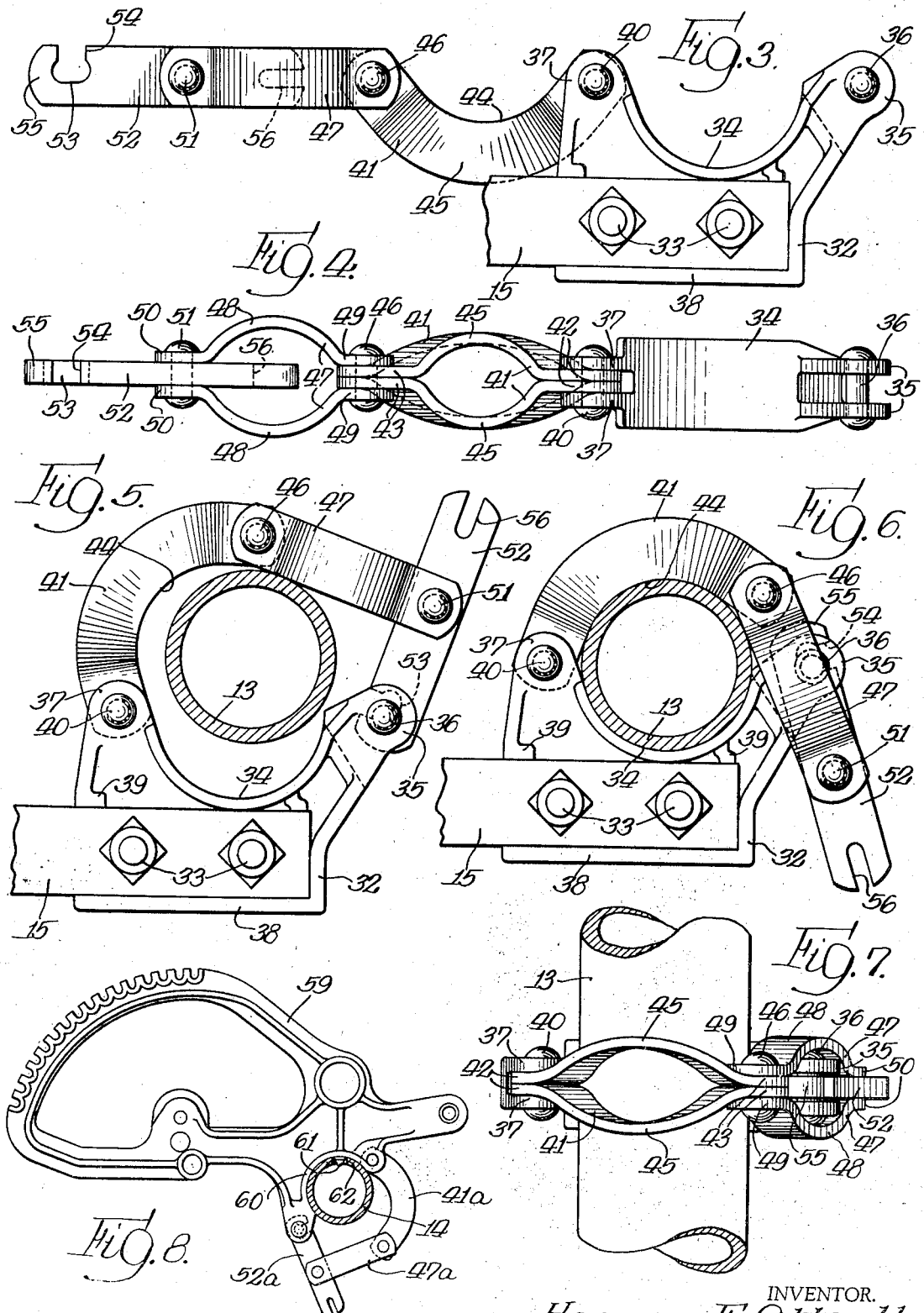

2,361,362

UNITED STATES PATENT OFFICE 2,361,362

TRACTOR IMPLEMENT ATTACHING MEANS

Herman E. Altgelt, South Bend, Ind., assignor to Oliver Farm Equipment Company, a corporation of Delaware Application October 15, 1941, Serial No. 415,001

5 Claims. (Cl. 248—230)

The present invention relates generally to tractor implement attachment, but more particularly to a quickly and easily operable detachable means for attaching or detaching a variety of implements or implement parts and the like to the tractor.

It has been the practice heretofore when attaching implements to a tractor such as planters, cultivators, plows and the like, to provide one or more transverse supporting beams on the tractor frame and rigidly bolt the frame member or beam of the implement to the transverse supporting frame member of the tractor. When necessity requires the change from one implement to another, considerable time and labor is required to remove the bolts to make the change. This is especially true when the bolts become rusted or the threads thereof battered. Occasionally difficulty arose when the bolts were lost or misplaced.

It is therefore the primary object of the present invention to provide a novel and improved attaching means in the form of a series of connecting links having a toggle lock arrangement associated therewith which is not only quickly detachable, but at the same time when locked, rigidly secures the implement in operative position on the implement support beam of the tractor.

Another object of the invention is to provide a novel and improved quickly detachable and attachable means for connecting agricultural implements or the like to a tractor which contains sufficient flexibility or elasticity so as to firmly grip the implement supporting beam or beams attached to the tractor regardless of the normal variations in size of the supporting beams.

A further object of the invention is to provide a novel and improved construction of quickly attachable and detachable means for attaching a variety of implements suspended from or supported on the tractor whereby the securing means embracing the supporting beams may be temporarily and loosely hooked thereon so that the implements or units thereof may be shifted laterally with respect to the tractor in its proper spaced relation with respect thereto and subsequently clamped for rigidly securing the implement to the tractor.

A still further object of the invention is to provide a novel and quickly detachable means for attaching or detaching lever sectors, braces or other parts of implements and the like to a tractor.

These and other objects are accomplished by providing a construction and an arrangement of the various parts in the manner hereinafter described and particularly pointed out in the appended claims.

Referring to the drawings:

Fig. 1 is a fragmentary side elevational view of a conventional tractor showing the manner in which my improved quick detachable and attachable means is adapted to be employed with a planter unit for attaching the same to a tractor;

Fig. 2 is an enlarged perspective view of the tool or bar which is adapted to be used in connection with manipulating my improved attaching means;

Fig. 3 is an enlarged side elevational view of my improved attaching means showing the same opened or extended;

Fig. 4 is a top plan view of the construction shown in Fig. 3;

Fig. 5 is an enlarged view of the clamping means showing the toggle link hooked to the bracket for temporarily supporting the implement on the transverse supporting beam of the tractor prior to locating the same in proper position on the tractor and prior to clamping the same rigidly thereto;

Fig. 6 is a similar view showing the manner in which the toggle link mechanism is actuated to clamp the attaching means to the supporting beam;

Fig. 7 is a top plan view of the construction shown in Fig. 6; and

Fig. 8 is a side elevational view in reduced form showing the manner in which the clamping means may be connected with or associated with a lever sector for clamping the same to the transverse supporting beam of the tractor.

The invention in the present instance is directed to a clamping means for quickly attaching implement and the like or implement parts to a tractor such as cultivators, listers, planters, fertilizer attachments, mowers, harvesters and the like or in fact, any type of attachment which is desired to be partly or wholly supported from or carried by the tractor construction. For the purpose of illustration, however, I have shown only one application of my improved attaching means in the form of a planter unit attached to the tractor. The tractor in this illustration comprises the usual longitudinally extending main frame 10, only a fragmentary portion of which is shown in Fig. 1 of the drawings and provided with the usual front steering means 11. The tractor is provided with the usual rear supporting and driven traction wheels 12. The tractor in this illustration is also provided with the usual transverse supporting beams or pipes 13 and 14. The pipes or supporting beams 13 and 14 in the drawings are located intermediate the front and rear supporting wheels and are rigidly secured in any well known manner to the tractor frame 10 of the tractor. These supporting beams 13 and 14 usually project laterally from and transversely with respect to the tractor frame for supporting a variety of implements therefrom. Under some circumstances, of course, a single transverse supporting means is only required, and may be secured to any part of the tractor frame, while in other instances, two of these transverse beams as illustrated in Fig. 1 of the drawings, may be used.

One application or use of my improved and quickly operable attaching means is shown in connection with a planter unit which is supported by and suspended from a longitudinal extending implement frame member or bar 15. Depending from an intermediate portion of the bar 15 is a vertically extending frame member 16. The lower end of this member 16 is reinforced by a diagonal brace 17. Pivotally connected as shown at 18 and 19 are parallel link members 20. The rear or free ends of the parallel link members 20 are pivotally connected as shown at 21 to a vertically extending post 22 which has its lower end as shown at 23 secured to a longitudinally extending planter frame member or beam 24. The vertical post 22 is braced to the beam 24 by a diagonal brace 25. The beam 24 is provided with the conventional shoe or opener 26 and seed conduit 27. Pivotally connected to the rear end of the planter beam or frame member 24 is the usual press or gauge wheel 28. This gauge wheel 28 is journaled in the frame 29 which in turn is pivoted as shown at 30 to the rear end of the frame member 24. The press wheel 28 is normally and yieldingly pressed into engagement with the ground by a conventional spring construction generally indicated by the reference character 31.

My improved quick attachable and detachable means comprises a bracket 32 of which there are two used in this particular instance, for supporting the frame member or bar 15 to each of the transverse pipes or beams 13 and 14 carried by the tractor. These brackets are secured to the forward and rearward ends respectively of the bar or frame member 15 by means of bolts 33. The upper portion of the bracket 32 has an arcuate or curved surface in the form of a flanged socket 34 which conforms to the curvature of the supporting pipe or beam 13. The curved surface 34 of the bracket 32 embraces substantially one half the periphery of the supporting member or pipe 13. Extending upwardly and in a direction away from the curved surface 34 are spaced apart apertured ears 35. Extending between and riveted to the ears 35 is a pin 36. Located diametrically opposite to the ears 35 and formed integrally with the bracket 32 are a second pair of spaced apart aligned apertured ears 37. The bracket 32 is provided with a longitudinal rib, as shown at 38, and oppositely disposed ribs 39 to form in effect a socket for securing the frame member 15 to the bracket. Pivoted on a pin 40 riveted in the apertured ears 37 is an arcuately curved and outwardly bowed link which comprises two spring steel members 41 made from flat steel bars. These members have their opposite ends flattened as shown at 42 and 43 so that they extend in parallelism and in contacting relation. The flattened portion of these links are located between the ears 37 and are pivoted on the pin 40 as is clearly shown in Figs. 4 and 7 of the drawings. The inner edges of these links 41 are curved as shown at 44 in substantial conformity to the peripheral surface of the pipe 13 while the intermediate portions are bowed out laterally as shown at 45 so as to present a yieldable or spring-like effect in the operation of clamping my improved attaching means to the beam or pipe in the manner hereinafter described. Pivoted to the flattened apertures and contacting ends 43 of the links 41 by means of a rivet or pin 46 is another link connection which is made in the form of two spring steel members 47. These members are also made from flat steel bars. The intermediate portions of the members 47 are bowed out laterally in arcuate formation as shown at 48 so as to provide a yielding link connection in the function of locking the toggle-link attachment to the supporting beam and also for the purpose of embracing the apertured ears 35 of the bracket 32 when the toggle-link arrangement is in its clamped position as shown in Figs. 1, 6 and 7 of the drawings. The opposite ends of the links 47 are flattened and extend in parallelism as shown at 49 and 50. The parallel ends 49 have aligned apertures and are pivotally secured to the outside surfaces of the aligned apertured ends 43 of the links 41. Pivoted between the apertured ends 50 of the links 47 on a pin 51 is an operating link or lever 52. The lever is pivoted on the pin 51 at a point intermediate its ends and is provided at one of its ends with a longitudinal slot 53 which is cut through on one edge, as shown at 54, so as to form in effect a hook-like end 55. The other end of the lever 52 is provided with a longitudinal slot 56 which is opened at the end of the member 52 so that a wrench or a tool in the form of a bar such as shown at 57 in Fig. 2 of the drawings, may be inserted therein for actuating the toggle link in the operation of clamping or unclamping the attaching means to or from the pipe 13. The tool or bar 57 is provided with one end angularly bent, as shown at 58, so that either end of the tool may be employed in order to make the locking and unlocking of the toggle-link more easily accessible from various positions.

The function and operation of my quick attachable and detachable means for connecting and disconnecting implements to a tractor is as follows: When the operator desires to attach an implement to a tractor such as is disclosed in Fig. 1 of the drawings, the attaching means which includes brackets 32 secured to both ends of a frame member 15 have their links 41, 47 and 52 opened in the manner disclosed in Figs. 3 and 4 of the drawings. The forward bracket may first be lifted into place so that the pipe 13 rests into the semi-circular recess 34 of the bracket 32, after which the hooked end portion 55 is swung into position so as to engage the transverse pin 36 and thereby loosely embrace the pipe 13 in the manner shown in Fig. 5 of the drawings. In a similar manner, the rear attaching means is temporarily supported on the rear pipe 14. While hanging in this suspended position, the frame member 15 and the front and rear brackets 32 may be adjusted along the pipes 13 and 14 until it is located in its proper spaced relation with respect to the tractor frame, after which a wrench or a tool such as shown at 57 in Fig. 2 of the drawings, may be inserted in the notch or slot 56 of the lever 52 and then by actuating the tool and the lever 52 in a clockwise direction as viewed in Fig. 5 of the drawings, from the position shown in Fig. 5 to that shown in Fig. 6. The clamping means will readily secure the implement in substantially rigidly fixed position on the supporting pipes or beams 13 and 14. In this connection it will be observed that upon the actuation of the lever 52 from the position shown in Fig. 5 to that shown in Fig. 6 of the drawings, the pivots 46 and 51 of the links 47 will be actuated passed dead center of the pivotal connection 36 forming the connection between the bracket 32 and the lever 52. The outwardly bowed portion 45 of the links 41 and the outwardly bowed portion 48 of the links 47 will afford sufficient resiliency or flexibility so as to insure a rigid clamping of the attaching means and will also take care of any substantial variations in the diameter of the supporting beam or pipe. In this connection it will also be noted that the bowed out portions 48 of the links 47 perform the double function of adding flexibility to the clamping means and at the same time permit the same to embrace the ears 35 of the bracket 32 so as to lock the pivoted connection of the toggle link passed dead center. With this novel attaching means, all the parts are pivotally connected together and are therefore always available when the implement is to be attached to the tractor.

In Fig. 8 of the drawings, I have illustrated a lever sector bracket which has formed integrally therewith a semi-circular socket 60 which is similar in shape and dimension to that of the semi-circular socket 34 of the bracket 32 shown in Figs. 3 to 7 inclusive of the drawings. In this construction, the sector bracket 59 has pivoted thereto a toggle link mechanism which includes links 41a, 47a and lever 52a, which are identical in construction and functions in a similar manner to the operating toggle-link mechanism shown in Figs. 1 to 7 of the drawings. The circular socket 60 of the lever sector 59 is provided with a downwardly extending lug 61 which is adapted to engage an aperture 62 in the transverse beam or pipe 14 for properly locating the lever sector 59 both horizontally and laterally with respect to the tractor construction so that a manual lever may be carried by the sector for adjusting various implements attached to or carried by the tractor. The attaching means in this instance, which includes the links 41a, 47a and lever 52a, function and operate identically like the clamping means of the toggle link mechanism illustrated and described in the other figures of the drawings. In this connection it will also be noted that similar detachable means may be used in connection with braces for supporting implements or may be used in connection with the mounting of sprayers or containers mounted on or carried by the transverse supporting beams of the tractor.

While in the above specification I have described one embodiment which my invention may assume in practice, it will of course be understood that the same is capable of modification and that modification may be made without departing from the spirit and scope of the invention as expressed in the following claims.

What I claim as my invention and desire to secure by Letters Patent is:

1. A quick, detachable securing means for attachment to a cylindrical member comprising a bracket having an arcuate socket engageable with said member, a pair of links having their intermediate portions bowed outwardly and their edges arcuately curved, said links being pivoted to said bracket, a second pair of links pivoted to said first named links, and a lever pivoted to said last named links having one end thereof engageable with said bracket whereby said lever may be actuated to clamp or unclamp said securing means to said member.

2. A quick detachable securing means for attachment to a pipe comprising a bracket having an arcuate socket formed therein and engageable with said pipe, a pair of links pivoted to said bracket and having their intermediate portions bowed outwardly, a second pair of links pivoted to the first pair of links and having their intermediate portions bowed outwardly, a lever pivoted to said last named pair of links, a pin carried by said bracket, and a hook formed on one end of said lever and engageable with said pin whereby said securing means may be loosely suspended from said pipe.

3. A quick detachable securing means for attachment to a pipe comprising a bracket having an arcuate socket formed therein and engageable with said pipe, a pair of links pivoted to said bracket and having their intermediate portions bowed outwardly, a second pair of links pivoted to the first pair of links and having their intermediate portions bowed outwardly, a lever pivoted to said last named pair of links, a pin carried by said bracket, and a hook formed on one end of said lever and engageable with said pin for forming a toggle link connection whereupon the actuation of said lever the pivots of certain of said links will lock passed dead center.

4. A quick detachable securing means for attachment to a pipe comprising a bracket having an arcuate socket formed therein and engageable with said pipe, a pair of links pivoted to said bracket and having their intermediate portions bowed outwardly, a second pair of links pivoted to the first pair of links and having their intermediate portions bowed outwardly, a lever pivoted to said last named pair of links, a pin carried by said bracket, a hook formed on one end of said lever and engageable with said pin whereby said securing means may be loosely suspended from said pipe, and means formed on the other end of said lever for engagement with a tool for actuating said lever to clamp said securing means to said pipe.

5. The combination with a supporting beam, a quick detachable means for securing an implement to said supporting beam comprising a bracket having a socket conforming to the shape of a beam, a toggle link connection operatively connected to said bracket, said toggle link connections comprising two pairs of outwardly bowed links forming flexible connections and adapted to contact said supporting beam, and a lever forming a part of said toggle link connection for yieldingly clamping said implement to said support beam.

HERMAN E. ALTGELT.